US011393052B2

(12) United States Patent
Werner et al.

(10) Patent No.: US 11,393,052 B2
(45) Date of Patent: Jul. 19, 2022

(54) GENERATING A PERSONALIZED MENU FOR SUBMITTING A CUSTOM ORDER

(71) Applicant: INTERNATIONAL BUSINESS MACHINES CORPORATION, Armonk, NY (US)

(72) Inventors: John S. Werner, Fishkill, NY (US); Pasquale A. Catalano, Wallkill, NY (US); Andrew G. Crimmins, Montrose, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 15/946,082

(22) Filed: Apr. 5, 2018

(65) Prior Publication Data
US 2019/0311445 A1    Oct. 10, 2019

(51) Int. Cl.
*G06Q 50/12*   (2012.01)
*G06Q 30/06*   (2012.01)
(Continued)

(52) U.S. Cl.
CPC .......... *G06Q 50/12* (2013.01); *G06F 16/287* (2019.01); *G06Q 10/087* (2013.01); *G06Q 30/0623* (2013.01)

(58) Field of Classification Search
CPC .. G06Q 50/12; G06Q 10/087; G06Q 30/0623; G06F 16/287
See application file for complete search history.

(56) References Cited

U.S. PATENT DOCUMENTS 5,899,502 A    5/1999  Giorno
7,680,690 B1 *  3/2010  Catalano ................ G06Q 30/02
                                                       705/15
(Continued)

FOREIGN PATENT DOCUMENTS

JP    6025464 B2    11/2016

OTHER PUBLICATIONS

H. Valdez-Pena, Menu planning using the exchange diet system, Jan. 1, 2003, SMC'03 Conference Proceedings. 2003 IEEE International Conference on Systems, Man and Cybernetics, vol. 3, pp. 3044-3049. (Year: 2003).*

(Continued)

*Primary Examiner* — Sangeeta Bahl
*Assistant Examiner* — Aaron N Tutor
(74) *Attorney, Agent, or Firm* — Cantor Colburn LLP; Teddi Maranzano

(57) ABSTRACT

A computer-implemented method includes identifying a first menu item on a standard menu of an establishment. A first plurality of ingredients of the first menu item are determined. A first subset of the first plurality of ingredients of the first menu item are categorized into a substitutable category. A second subset of the first plurality of ingredients of the first menu item are categorized into a non-substitutable category. Each ingredient of the first menu item that is in the substitutable category is compared to user preferences. A substitutable ingredient of the substitutable category is excluded, based on the comparisons, where the substitutable ingredient is in the first menu item. An available substitute is automatically identified for the substitutable ingredient of the substitutable category. A personalized menu of menu items selected from the standard menu is generated, where the personalized menu includes the first menu item modified with the available substitute.

20 Claims, 5 Drawing Sheets

(51) Int. Cl.
*G06Q 10/08* (2012.01)
*G06F 16/28* (2019.01)

(56) References Cited

U.S. PATENT DOCUMENTS

| | | | |
|---|---|---|---|
| 9,159,088 B2 | 10/2015 | Dillahunt et al. | |
| 2009/0275002 A1* | 11/2009 | Hoggle | G16H 20/60 434/127 |
| 2014/0172569 A1 | 6/2014 | Banda et al. | |
| 2015/0161912 A1* | 6/2015 | Bhattacharjya | G06F 16/24578 434/127 |
| 2015/0199777 A1 | 7/2015 | Rodriguez | |
| 2016/0307128 A1* | 10/2016 | Herman | G06Q 20/209 |
| 2017/0031966 A1* | 2/2017 | Bhatt | G16H 20/60 |
| 2018/0249861 A1* | 9/2018 | Hiatt | A23L 5/10 |

OTHER PUBLICATIONS

Authors et. al.: Disclosed Anonymously, "Dynamic Customized Menu selection ordering system UI," IPCOM000248133D, Oct. 28, 2016, pp. 1-3.
Authors et. al.: Disclosed Anonymously, "Menu Visualization based on Viewer Profile," IPCOM000246657D, Jun. 24, 2016, pp. 1-3.
Daraghmi et al.,"PMR: Personalized mobile restaurant system," 5th International Conference on Computer Science and Information Technology, (CSIT), 2013, pp. 275-282.
DineSafe LLC, "Hacking Allergies & Health Trends for Restaurants & Guests With DineSafe App," Retrieved from: https://www.prnewswire.com/news-releases/hacking-allergies-health-trends-for-restaurants-guests-with-dinesafe-app-300410606.html, Feb. 21, 2017, pp. 1-5.

* cited by examiner

GENERATING A PERSONALIZED MENU FOR SUBMITTING A CUSTOM ORDER

BACKGROUND

The present invention relates to restaurant menus and, more specifically, to generating a personalized menu for submitting a custom order.

Restaurant menus can often be overwhelming. Some menus span multiple pages and can cause users to skim, thereby overlooking options those users might otherwise order. Additionally, if a user has allergies or even food preferences, the user will have to manually exclude food items or ask a server questions about substitutions. As a result, the food ordering process can be extensive in terms of both time and energy expenditure, and the result may be a food item that is not optimal given the user's preferences and actual food availability at the restaurant.

SUMMARY

Embodiments of the present invention are directed to a computer-implemented method for generating a personalized menu. A non-limiting example of the computer-implemented method includes identifying a first menu item on a standard menu of an establishment. A first plurality of ingredients of the first menu item are determined. A first subset of the first plurality of ingredients of the first menu item are categorized into a substitutable category. A second subset of the first plurality of ingredients of the first menu item are categorized into a non-substitutable category. Each ingredient of the first menu item that is in the substitutable category is compared to user preferences. A substitutable ingredient of the substitutable category is excluded, where the substitutable ingredient is in the first menu item, based at least in part on comparing each ingredient of the first menu item that is in the substitutable category to the user preferences. An available substitute is automatically identified for the substitutable ingredient of the substitutable category, responsive to excluding the substitutable ingredient. A personalized menu of menu items selected from the standard menu is generated, where the personalized menu includes the first menu item modified with the available substitute, based at least in part on identifying the available substitute for the substitutable ingredient.

Embodiments of the present invention are directed to a system for generating a personalized menu. A non-limiting example of the system includes a memory having computer-readable instructions and one or more processors for executing the computer-readable instructions. The computer-readable instructions include identifying a first menu item on a standard menu of an establishment. Further according to the computer-readable instructions, a first plurality of ingredients of the first menu item are determined. A first subset of the first plurality of ingredients of the first menu item are categorized into a substitutable category. A second subset of the first plurality of ingredients of the first menu item are categorized into a non-substitutable category. Each ingredient of the first menu item that is in the substitutable category is compared to user preferences. A substitutable ingredient of the substitutable category is excluded, where the substitutable ingredient is in the first menu item, based at least in part on comparing each ingredient of the first menu item that is in the substitutable category to the user preferences. An available substitute is automatically identified for the substitutable ingredient of the substitutable category, responsive to excluding the substitutable ingredient. A personalized menu of menu items selected from the standard menu is generated, where the personalized menu includes the first menu item modified with the available substitute, based at least in part on identifying the available substitute for the substitutable ingredient.

Embodiments of the invention are directed to a computer-program product for generating a personalized menu, the computer-program product comprising a computer-readable storage medium having program instructions embodied therewith. The program instructions are executable by a processor to cause the processor to perform a method. A non-limiting example of the method includes identifying a first menu item on a standard menu of an establishment. Further according to the method, a first plurality of ingredients of the first menu item are determined. A first subset of the first plurality of ingredients of the first menu item are categorized into a substitutable category. A second subset of the first plurality of ingredients of the first menu item are categorized into a non-substitutable category. Each ingredient of the first menu item that is in the substitutable category is compared to user preferences. A substitutable ingredient of the substitutable category is excluded, where the substitutable ingredient is in the first menu item, based at least in part on comparing each ingredient of the first menu item that is in the substitutable category to the user preferences. An available substitute is automatically identified for the substitutable ingredient of the substitutable category, responsive to excluding the substitutable ingredient. A personalized menu of menu items selected from the standard menu is generated, where the personalized menu includes the first menu item modified with the available substitute, based at least in part on identifying the available substitute for the substitutable ingredient.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
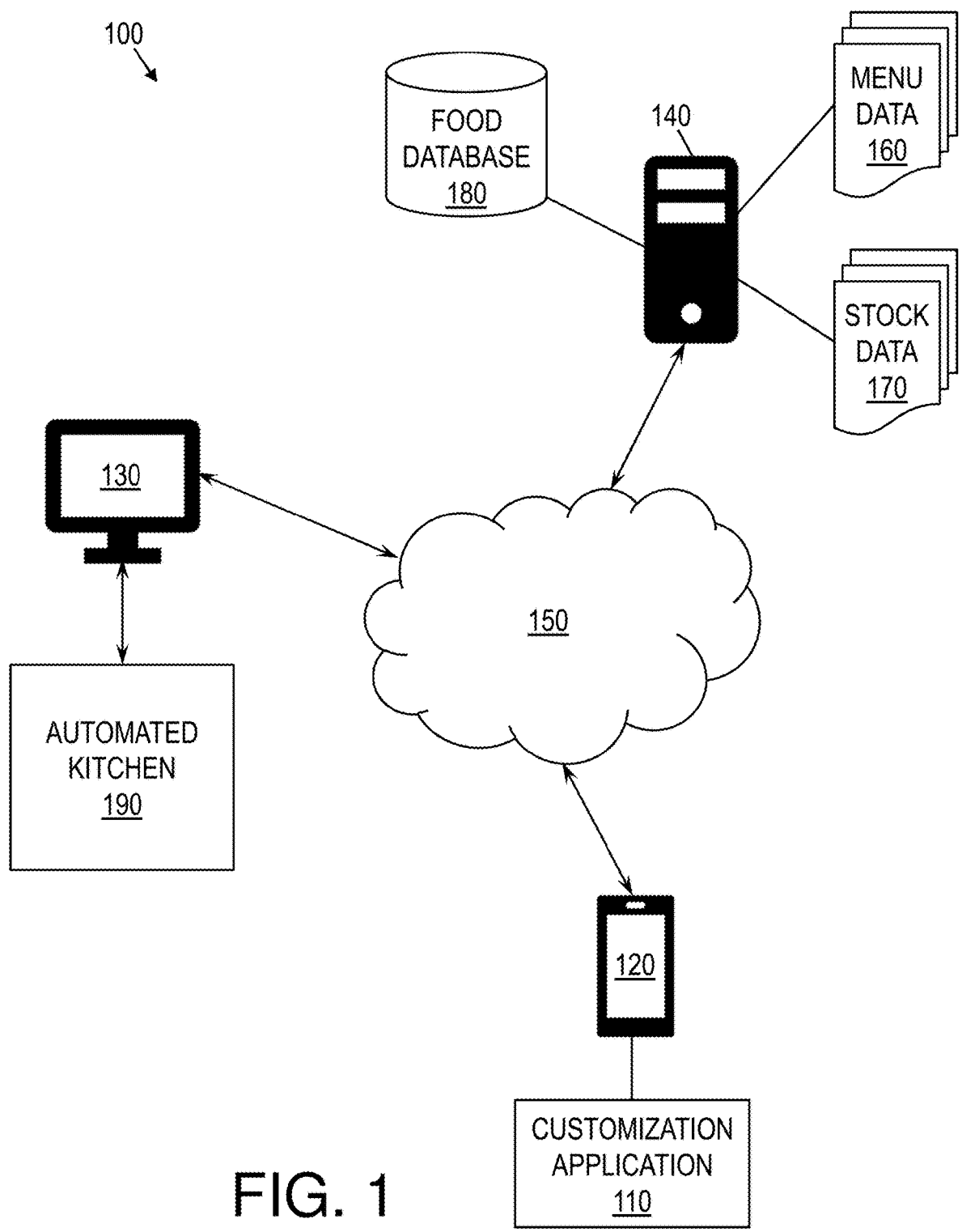
FIG. 1 is a block diagram of a customization system according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, some systems exist to help a user parse a restaurant menu. Specifically, these systems exclude food items that include a user's known allergies, thus reducing the potential distraction so that the user can concentrate on foods he or she is able to eat. Other systems simply sort menu items based on a user's history of orders. However, these existing systems are unnecessarily limiting in that they do not allow enough options to make substitutions and customizations.

Turning now to an overview of the aspects of the invention, one or more embodiments of the invention address the above-described shortcomings of the prior art by providing a mechanism that automatically provides substitutions, which can be customized based on meal settings and user preferences, such as allergies, likes, dislikes, order history, or time constraints, for example. The ingredients of each menu item may be categorized as substitutable or non-substitutable. If a non-substitutable ingredient of a menu item does not meet certain criteria, then the menu item may be excluded. However, if an ingredient of the menu item is substitutable or removable, then the menu item may be displayed as an option, with the ingredient either substituted or removed. Once made, the user's order may be automatically transmitted to the restaurant, and automated preparations may be performed. Further, user feedback and orders may be analyzed to update customizations for the future.

The above-described aspects of the invention address the shortcomings of the prior art by excluding only those menu items for which substitutions are not possible, rather than unnecessarily excluding menu items that might be optimal for the user given customized substitutions. In some embodiments of the invention, selection of a menu item is transmitted to the restaurant or the kitchen over a network. If the kitchen is an automated kitchen, selection of the menu item may automatically initiate preparation of the menu item.

Turning now to a more detailed description of aspects of the present invention, FIG. 1 is a block diagram of a customization system 100 according to some embodiments of the invention. The customization system 100 may provide a personalized menu for a user, based on current stock of the establishment as well as user preferences and meal settings, where the user preferences and meal settings may include one or more of the following: time constraints, budget constraints, health concerns, likes, dislikes, and allergies.

As shown in FIG. 1, the customization system 100 may include a customization application 110, which may run on a user device 120, such as a mobile phone or tablet. For example, the user device 120 may belong to a user or may belong to an establishment, such as a restaurant, thereby enabling the user to access the customization application 110 while located at the establishment. In some embodiments of the invention, the various activities described below that involve presenting or displaying to the user, or receiving selections from the user, may be performed though the customization application 110. The customization application 110 may be implemented, at least in part, as software running over the hardware of the user device 120.

The customization system 100 may be associated with one or more establishments, such as restaurants. Each establishment may have a console 130, which may be in communication with a centralized server 140, or cloud, over a network 150. It will be understood that, although only a single console 130 is illustrated in FIG. 1, the customization system 100 may be associated with a plurality of establishments, each having one or more corresponding consoles 130. Generally, a console 130 may receive input from personnel at the corresponding establishment as needed, where that input may include menu data 160 and stock data 170 of the establishment. The menu data 160 may describe a menu of the establishment, including a plurality of menu items, or food items appearing on the menu. In some cases, the menu data 160 may also include ingredients of menu items. The stock data 170 may describe actual real-time, or near real-time, inventory of the establishment.

In some embodiments of the invention, the centralized server 140 maintains the menu data 160 and the stock data 170 associated with each establishment participating in the customization system 100. The centralized server 140 may also maintain a food database 180, which may include various data utilized by the customization system 100. Additionally, the centralized server 140 may be responsible for activities to be performed remotely, away from the customization application 110 used by the user, and may be further responsible for transmitting communications between the console 130 and the customization application 110.

The food database 180 may maintain various data related to food items. The food database 180 may be implemented through various mechanisms. For example, and not by way of limitation, the food database 180 may be a relational database, unstructured data, one or more text files, or the like. In some embodiments of the invention, the food database 180 includes substitution options for various ingredients, where each substitution option may indicate that a second ingredient can be substituted for a first ingredient either in a select set of food items or in general. The food database 180 may maintain common ingredients found in food items that are known to the customization system 100; estimated preparation times of food items, which may be based on historical preparation times; or coupons applicable to food items at particular establishments. Further, the food database 180 may include user reviews of food items prepared at various establishments. In some embodiments of the invention, the food database may be crowd-sourced, at least in part, such that users may provide updates to the food database 180. For example, and not by way of limitation, a user may update the food database 180 to indicate that a certain establishment uses specific ingredients in one of its menu items.

In some embodiments of the invention, an establishment participating in the customization system 100 may have an automated kitchen 190, which may be capable of automatically performing one or more tasks related to physical tracking of inventory or physical preparation of food items. In such cases, the automated kitchen 190 of an establishment may be in communication with the console 130. In that manner, food orders or inventory orders may be communicated between the console 130 and the automated kitchen 190 as needed.

Figure 2:
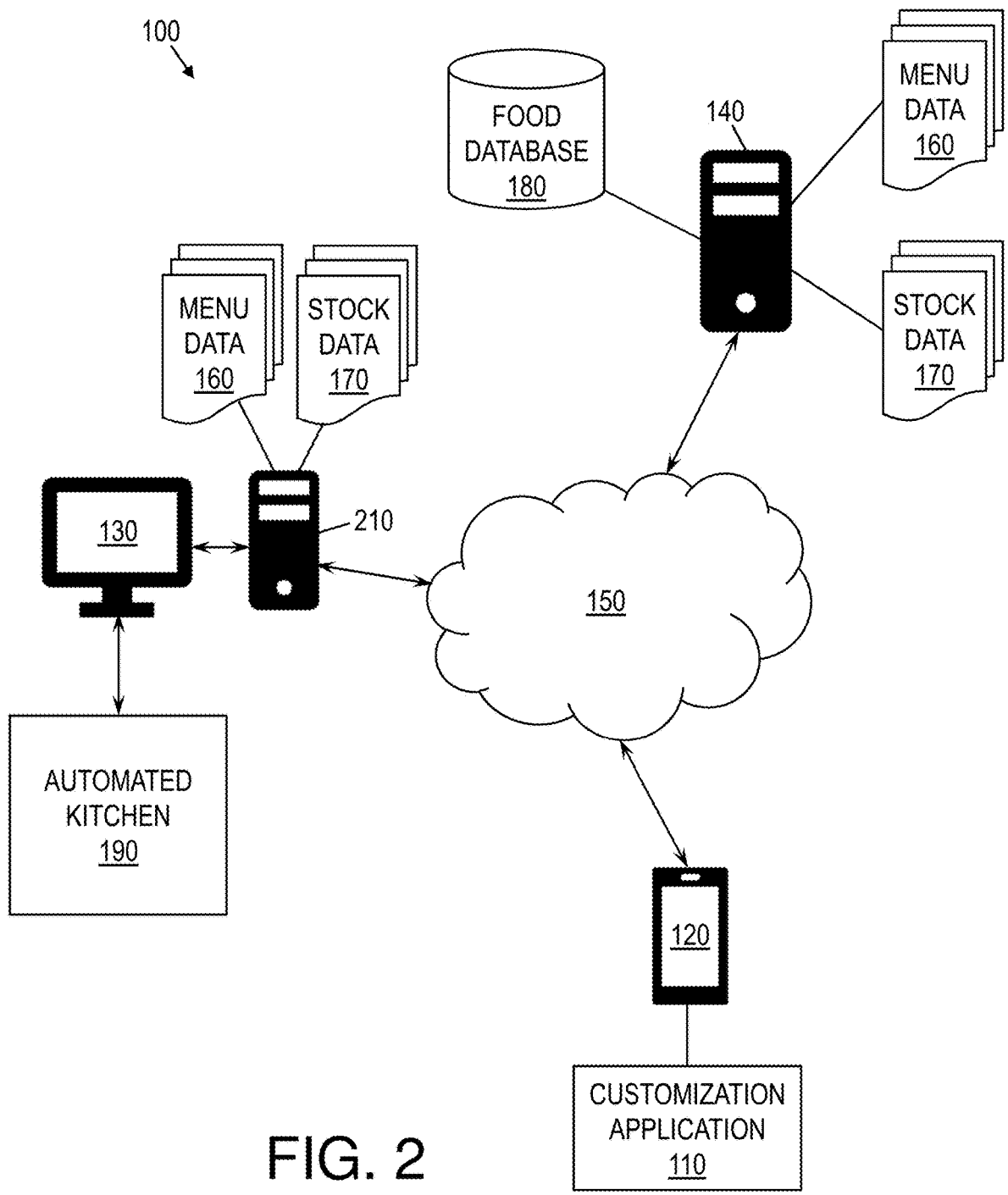
FIG. 2 is another block diagram of the customization system according to some embodiments of this invention.

FIG. 2 is another block diagram of the customization system 100 according to some embodiments of the invention. Specifically, FIG. 2 is a variation of the customization system 100 shown in FIG. 1. As shown in FIG. 2, various components may be the same as those shown in FIG. 1. However, in some embodiments of the invention, in addition to the centralized server 140, or in place of it, the customization system 100 may include an establishment server 210 associated with each establishment. In this case, each establishment server 210 may essentially perform the activities of the centralized server 140 but may be limited to the associated establishment. For instance, an establishment server 210 may maintain the menu data 160 and the stock data 170 of only the one or more establishments with which it is associated. Further, the establishment server 210 may perform remote operations of the customization system 100 with respect to the associated establishment.

It will be understood by one skilled in the art that some embodiments of the invention may include at least one centralized server 140 as well as one or more establishment servers 210, such that some establishments have associated establishment servers 210 while others do not and thus rely more heavily on the centralized server 140. Further, it will be understood that various activities of the customization system 100 described below could be performed at the customization application 110, at the centralized server 140, or at the applicable establishment server 210, depending on design goals.

Figure 3A:
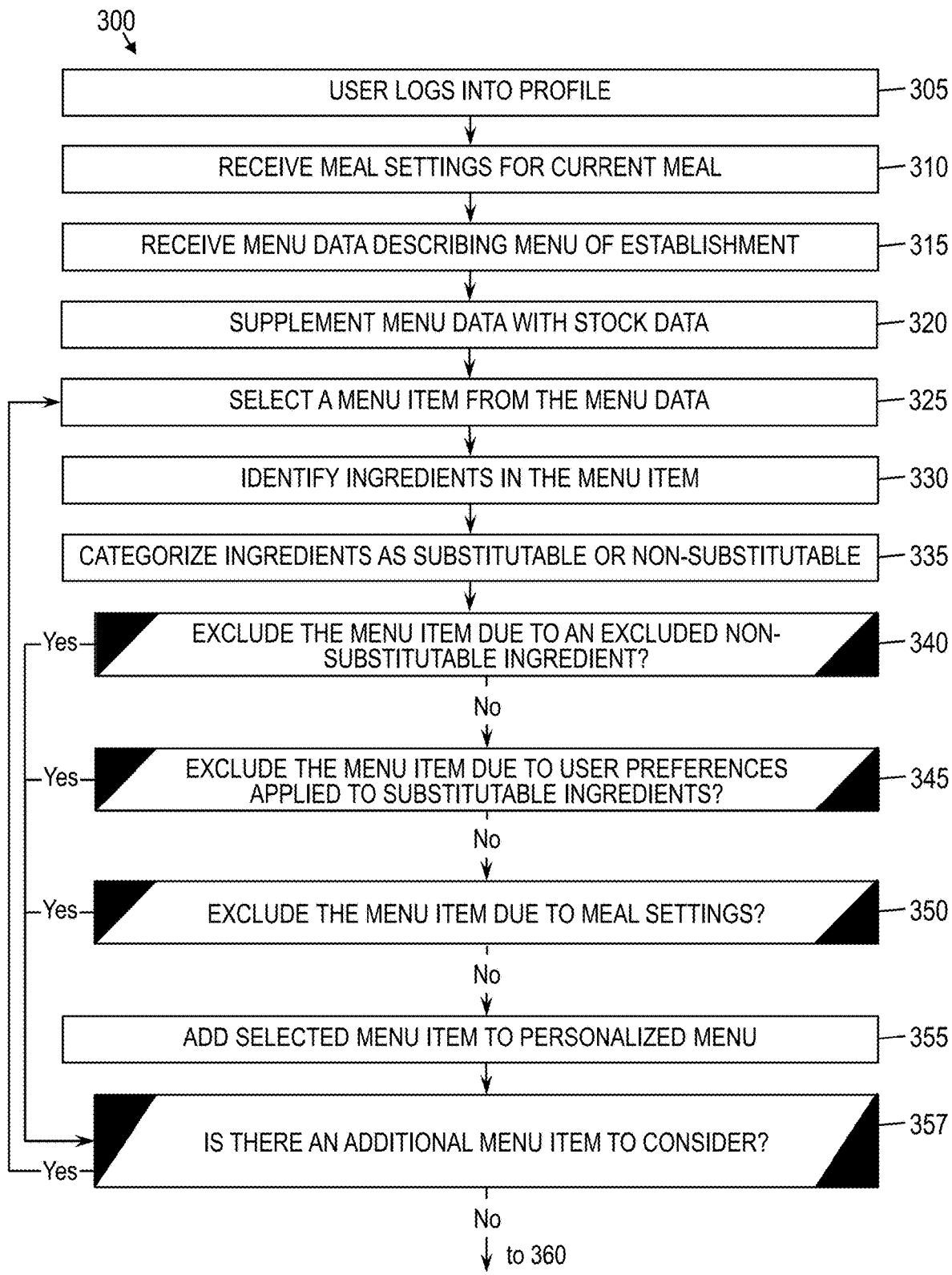
FIGS. 3A-3B together are a flow diagram of a method for generating a personalized menu and submitting a custom order, according to some embodiments of this invention.
Figure 3B:
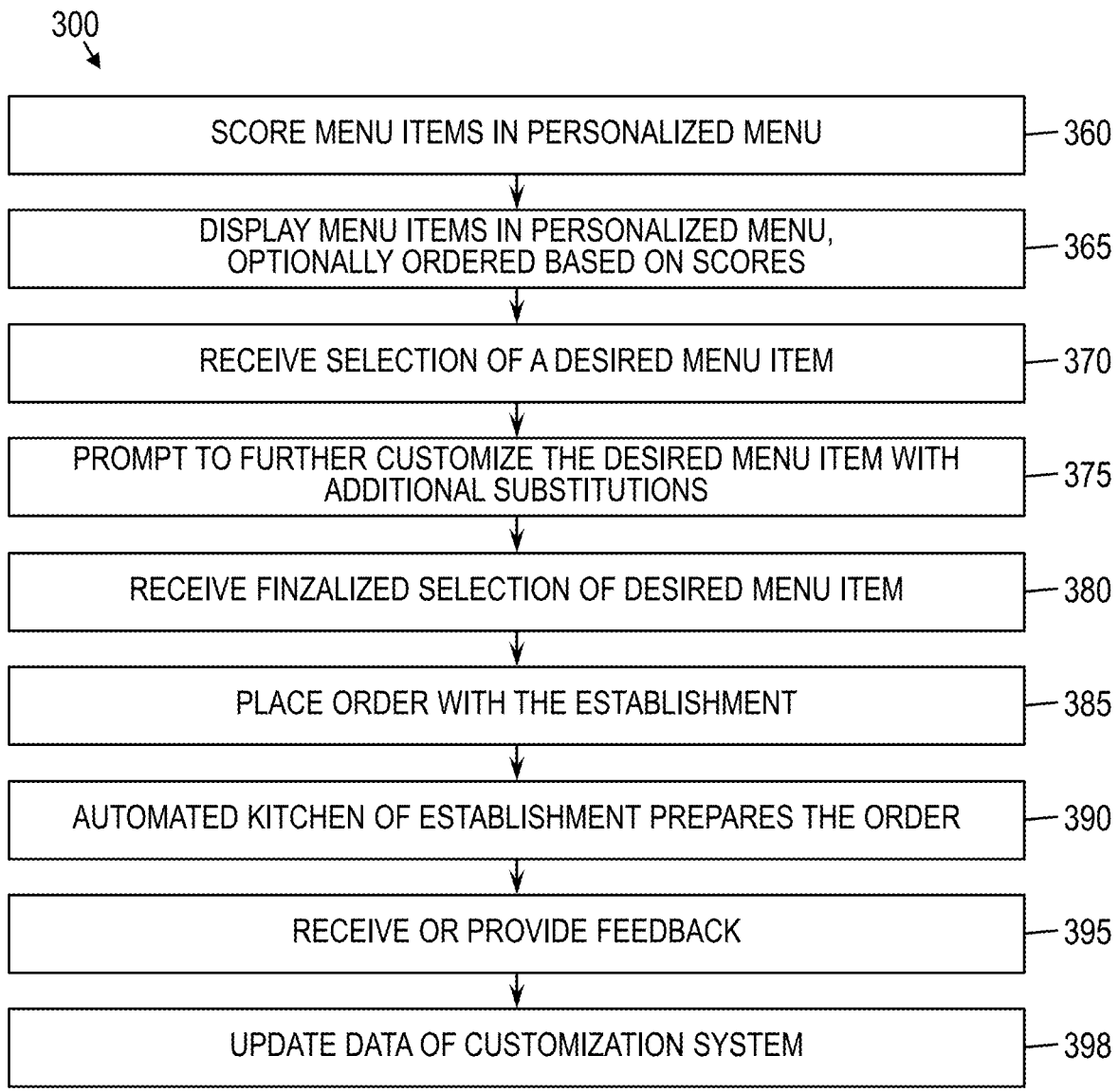

FIGS. 3A-3B together are a flow diagram of a method 300 for personalizing a menu and submitting an order, according to some embodiments of this invention. It will be understood that the order of activities shown in FIGS. 3A-3B and described herein are provided for illustrative purposes only, and that the order of some activities relative to one another may change, as will be understood by one skilled in the art.

As shown in FIG. 3A, at block 305, a user may log in to his or her profile with the customization system 100. If the user is new to the customization system 100, logging in may require initially establishing a user profile. The user profile may be a representation of the user with respect to the customization system 100. Data related to order history, user preferences, or other data specific to the user may be stored in association with the user profile. In some embodiments of the invention, the user profile includes connections to other users, such as social media connections or former dining companions. This data may be submitted to the customization system 100 by the user, through use of the customization application 110. In some embodiments of the invention, this data in the user profile is stored on the user device 120 itself. Alternatively, however, this data may be stored on the centralized server 140, the establishment server 210, or a combination of both.

The user preferences may include static preferences and meal settings, where static preferences are maintained across meals until the user changes them, and meal settings apply to one or more meals in particular, such as a current meal. The user preferences may include static preferences, such as food likes, dislikes, allergies, health concerns (e.g., high cholesterol, high blood pressure), or other information. The user preferences may also include meal settings, such as a time budget or a cost budget, which may generally apply to a current meal or one or more specified meals. In some embodiments of the invention, the static preferences may include default meal settings, such as a default time budget or cost budget, which may be applied to each meal unless overridden by temporary meal settings. In some embodiments of the invention, the static preferences may include one or more parental controls, which may limit or restrict the selection of certain ingredients of menu items.

At block 310, the customization system 100 may receive, by entry from the user through the customization application 110, any meal settings the user wishes to provide. As mentioned above, meal settings may include a time budget and a cost budget for a current meal. If these are not received, default values may be used. The cost budget may indicate how much the user wishes to spend for the current meal or for an individual menu item in the current meal, while the time budget may indicate how much time the user has for the meal. Meal settings may also include one or more temporary updates to the static preferences, where these temporary updates may be applicable for only the current meal or for as long as the user indicates. For example, and not by way of limitation, the user may be having a celebratory meal and may indicate that a static preference for making low-cholesterol selections may be lifted for the current meal.

At block 315, menu data 160 associated with a particular establishment may be received, such as at the customization application 110. The menu data 160 may describe menu items, or dishes, that are on the menu for the establishment. The menu data 160 may be provided through various mechanisms. For example, if the user device 120 belongs to the establishment, then the menu data may be stored on the user device 120 prior to use by the user.

If the menu data 160 is not already stored on the user device 120, then the customization application 110 may download the menu data 160 from a remote location, such as the establishment server 210 or the centralized server 140. To do so, the customization system 100 may first determine from which establishment the user wishes to order. For example, and not by way of limitation, the customization application 110 may determine in which establishment the user is currently located by utilizing location tracking, such as a global position system (GPS) of the user device 120. Alternatively, however, the user may manually select an establishment. Upon identifying the establishment, the customization application 110 may request menu data 160 for that establishment from a remote location, such as the establishment server 210 or the centralized server 140.

At block 320, the menu data 160 may be supplemented with stock data 170, which may describe the true availability of ingredients in the establishment. Specifically, in some embodiments of the invention, the stock data 170 may be received at the customization application 110 to supplement the menu data 160. In some cases, one or more ingredients may be in stock at the establishment. Additionally, in some cases, an establishment may have ingredients that do not appear on the menu or in the menu data 160. The stock data 170 thus supplements the menu data 160 with real-time or near real-time information.

In some embodiments of the invention, the stock data 170 may be tracked manually. For example, establishment personnel may update the stock data 170 manually at the console 130 based on observations of ingredient availability, and that stock data 170 may be communicated to the user device 120, such as by way of the centralized server 140 or the establishment server 210. For another example, the console 130 may automatically receive updates to stock data 170 based on inventory orders placed by the establishment and detection of inventory changes. For instance, the stock data 170 may be updated to account for increased inventory when an inventory order is placed or when new inventory is received based on an inventory order. When food orders are received from users, the stock data 170 may be automatically updated to account for a reduction in inventory corresponding to the inventory needed to prepare the food orders. In some embodiments, these automated updates to stock data 170 occur with each order, but alternatively, these updates may occur periodically. Alternatively, in some embodiments of the invention, inventory may be placed on smart scales or other detection mechanisms, such that when inventory is removed, the resulting change in inventory may be detected and communicated to the console 130. In turn, the stock data 170 may be communicated to the user device 120 as needed.

The customization system 100 may perform an iterative loop over the menu items described in the menu data 160, and thus over the menu items on the menu. More specifically, in some embodiments of this invention, this loop may be performed locally at the user device 120.

To begin an iteration, at block 325, the customization system 100 may select a menu item for analysis from the menu data 160. In analyzing the selected menu item, as will be described further below, the customization system 100 may determine whether and how to present the menu item to the user as an option for the current meal.

At block 330, the customization system 100 may identify ingredients in the selected menu item. In some embodiments of the invention, the customization system 100 seeks to identify all ingredients, but it will be understood that this may not always be possible. The ingredients may be determined by various mechanisms. For example, and not by way of limitation, the menu data 160 may include ingredients for the selected menu item. For another example, the food database 180 may have a record of common ingredients found in the selected menu item. When the selected menu item matches a known food item in the food database 180, then the common ingredients of that known food item may be deemed to be the ingredients in the selected menu item, unless the menu data 160 presents conflicting ingredients.

At block 335, the customization system may categorize the ingredients in the selected menu item into two categories, substitutable and non-substitutable, based on whether another ingredient can be substituted for the ingredient in question. In some embodiments of the invention, each ingredient is added to one of these categories, and these categories are mutually exclusive. Further, in some embodiments of the invention, if it is unknown whether an ingredient is substitutable, then the ingredient may be categorized as non-substitutable.

For instance, an ingredient that is pre-mixed into a menu item, such as mayonnaise might be pre-mixed into potato salad, cannot be substituted and would thus be placed in the non-substitutable category. An ingredient that is crucial to a menu item, such as potatoes are to potato salad, may be deemed non-substitutable. In contrast, an ingredient that is sprinkled on top, such as bacon bits might be sprinkled on top of a salad, may be substituted and may thus be placed in the substitutable category. It will be understood that categorization of a common ingredient may vary from one menu item to the next. Whether an ingredient is substitutable or non-substitutable may be described by the menu data 160 or by the food database 180, for example. With respect to the food database 180, the categorization of an ingredient in a menu item at a particular establishment may be determined at least in part by crowd-sourcing of the food database 180.

At decision block 340, it may be determined whether to exclude the selected menu item based on a non-substitutable ingredient (i.e., ingredients in the non-substitutable category) being excluded. Specifically, such exclusion of a non-substitutable ingredient may occur based on user preferences or stock data 170. As discussed above, the user preferences may indicate dislikes and allergies. Thus, it may be determined whether any non-substitutable ingredient matches a dislike or allergy of the user, in which case that non-substitutable ingredient may be excluded. Further, as discussed above, the user may have indicated health concerns in the user preferences. Thus, it may be determined whether any non-substitutable ingredient conflicts with the user's health concerns, in which case that non-substitutable ingredient may be excluded and the selected menu item may be excluded as a result. For example, if the user is concerned about high cholesterol and the selected menu item has bacon as a non-substitutable ingredient, then the ingredient, as well as the selected menu item, may be excluded. Further, if the stock data 170 indicates that a non-substitutable ingredient is not currently available, then that non-substitutable ingredient may be excluded, as may be the selected menu item as a result. In short, because non-substitutable ingredients cannot be removed or replaced, an exclusion of even one non-substitutable ingredient excludes the selected menu item as a whole, according to some embodiments of the invention.

If the selected menu item is excluded at decision block 340, then the method 300 may skip ahead to decision block 357 to determine whether there are additional menu items to consider. However, if the selected menu item is not excluded, then the method 300 may continue to decision block 345.

At decision block 345, it may be determined whether to exclude the selected menu item based on user preferences as applied to substitutable ingredients (i.e., ingredients in the substitutable category). More specifically, the selected menu item may be excluded if it includes a substitutable ingredient for which an available substitute complying with the user preferences cannot be found.

Each substitutable ingredient may be compared to ingredients excluded in the user preferences, where excluded ingredients include those the user indicated are disliked, ingredients to which the user has indicated an allergy, or other ingredients the user has explicitly chosen to exclude. Implicit exclusions may also be considered and applied. For example, and not by way of limitation, if the user has indicated that cholesterol is a health concern, then the customization system 100 may exclude ingredients that are known to be high in cholesterol. For each substitutable ingredient found to be excluded, the customization system 100 may seek a substitution. It will be understood that, in some cases, an ingredient may be substituted with nothing, and thus simply removed from the menu item.

In some embodiments of the invention, the food database 180 maintains a list of substitutes for various ingredients. According to the food database 180, a substitution of a first ingredient in place of a second ingredient may be deemed appropriate for specific food items or for the second ingredient in general. For example, and not by way of limitation, the food database 180 may indicate that bacon may be substituted with nothing or turkey bacon on a burger, but may also indicate that bacon can be substituted for turkey bacon but not with nothing on a bacon, lettuce, and tomato sandwich, in which some form of bacon is a key ingredient. Thus, it will be understood that appropriate substitutions may vary across various menu items. If a substitute is identified for an excluded substitutable ingredient, it may be determined whether that substitute is available based on the stock data 170.

If one or more available substitutes are identified for an excluded substitutable ingredient of the selected menu item, then the customization system 100 may select one of such substitutes to be substituted for the excluded ingredient. In some embodiments of the invention, the selection of which substitute to use is based on a ranking of ingredients. The ranking of ingredients may be based on various considerations, such as frequency of ordering menu items with the ingredients in the user's order history, similarity to the substitutable ingredient, explicit ranking made by the user and associated with the user profile.

If no available substitute is identified for an excluded substitutable ingredient in the selected menu item, then the selected menu item as a whole may be excluded. Alternatively, in some embodiments of the invention, if a substitute is identified for each excluded substitutable ingredient, then the selected menu item is not excluded.

If the selected menu item is excluded at decision block 345, then the method 300 may skip ahead to decision block 357 to determine whether there are additional menu items to consider. However, if the selected menu item is not excluded, then the method 300 may continue to decision block 350.

At decision block 350, the customization system 100 may apply the meal settings to determine whether to exclude the selected menu item based on those meal settings. As discussed above, meal settings may include a time budget and cost budget for the current meal. These may be default values or may be specific to the current meal. If there are no meal settings, then the selected menu item may be automatically deemed to not conflict with any meal settings. If it is estimated that the selected menu item would take longer to prepare, or to prepare and eat, than the time budget allows for the meal, then the selected menu item may be excluded. Preparation time may be estimated based on various factors. For example, in some cases, the menu data 160 of the food database 180 may include estimates of preparation times, and in that case, such estimates may be used. In some embodiments of the invention, estimated preparation times in the food database 180 may be based on historical preparation time, which may be crowd-sourced. Further, the menu data 160 may include prices of the menu items. If the price of the selected menu item exceeds the cost budget for the entire current meal or the cost budget for an individual food item of the current meal, then the selected menu item may be excluded.

If the selected menu item is excluded at decision block 350, then the method 300 skip ahead to decision block 357 to determine whether there are additional menu items to consider. However, if the selected menu item is not excluded, then the method 300 may continue to block 355.

At block 355, it has now been determined that the selected menu item has not been excluded, and thus the selected menu item may be added to the user's personalized menu. At decision block 357, if further menu items remain to be considered in the menu data, then the method 300 may return to block 325 to select another menu item. Otherwise, if all menu items gave been considered, then the method 300 may continue to block 360, which appears in FIG. 3B.

As shown in FIG. 3B, at block 360, in some embodiments of the invention, the menu items in the personalized menu are scored, or ranked. The score assigned to a menu item may consider various factors, such as one or more of the following: frequency with which the user ordered the menu item according to the order history; the number of times the user ordered the menu item according to the order history; food likes specified in the user preferences; health concerns according to the user preferences; ranking or scoring of ingredients according to the user preferences; ranking or scoring of food items according to user preferences; price; reviews provided by the user, reviews by users known to be connected to the user, reviews by other users, or a combination of these; restaurant specials; and flavor combinations known to complement one another. Further, in some embodiments of the invention, one or more versions of each menu item in the personalized menu may be scored, with substitutions for substitutable ingredients varying from one version to the next.

At block 365, the customization system 100 may display the personalized menu to the user. In some embodiments of the invention, this display is performed by the customization application 110. If the menu items were scored, such as described with respect to block 360, then the menu items may be displayed in the personalized menu in an order corresponding to their scores. For example, and not by way of limitation, menu items with higher or better scores may be placed above menu items with lower or worse scores in the personalized menu, as displayed. Further, the menu data 160 may categorize menu items, such that each menu item is categorized as an appetizer, entrée, drink, dessert, or the like, for example. If the menu items are categorized, then in some embodiments of the invention, the personalized menu may be similarly categorized. If scoring is used, the menu items may be ordered within each category according to the scores.

For menu items for which multiple variations were scored, based on possible substitutions, one or more of such variations may be displayed. For example, all of the variations may be displayed, thus showing all possible variations of the menu item that do not have excluded ingredients. For another example, however, only variations meeting or exceeding a threshold score may be displayed in the personalized menu.

In some embodiments of the invention, in the displayed personalized menu, each menu item may be associated with additional information. This additional information may include, for example, user reviews, substitution options, and available coupons. In some embodiments of the invention, the additional information includes information about the order history or reviews of other users connected to the user. For example, if the user's profile indicates a social media connection with a second user or indicates that the user has dined with the second user, and if the customization system 100 is aware that the second user has ordered a particular menu item, then the customization system 100 may include this history as additional information related to the particular menu item. This additional information may be displayed along with the personalized menu or, for example, the customization system 100 may enable the user to request to view the additional information. For example, and not by way of limitation, the customization application 110 may display a link or button that the user can select to prompt display of the additional information.

At block 370, the customization system 100 may receive a selection of a menu item from the user. In some embodiments of the invention, the personalized menu displayed to the user enables the user to select at least one menu item, now referred to as the desired menu item. It will be understood that multiple menu items may be selected, and in that case, each may be treated as described below.

At block 375, the customization system 100 may prompt the user to further customize the desired menu item. As described above the desired menu item may already be modified by one or more substitutions. However, in some embodiments of the invention, when the user selects a desired menu item, the customization system 100 enables the user to select one or more additional substitutions. Specifically, for example, for each substitutable ingredient, the customization system 100 may prompt the user to select from the available substitutes or keep the current ingredient, thus enabling further customization of the desired menu item. In some embodiments of the invention, for each substitutable ingredient, the substitutes displayed to the user corresponding to an ingredient may be ordered, or ranked, according to their scores.

At block 380, the customization system 100 may receive a finalized selection for each desired menu item. This finalized selection may include selection of any substitutions the user desires.

At block 385, an order may be placed with the establishment, where that order includes the one or more desired menu items, as customized by the user. In some embodiments of the invention, to place the order, the customization system 100 may digitally transmit the order to the establishment, for example, to the console 130. The order may include the desired menu items, as customized by the user.

At block 390, if the establishment has an automated kitchen 190, the automated kitchen 190 may prepare the order, in part or full. For example, and not by way of limitation, the console 130 may communicate, to the automated kitchen 190, preparation instructions related to the order. In turn, an oven or stove in the automated kitchen 190 may automatically adjust to the temperature needed to prepare the order, or ingredients may be automatically picked from their storage location and arranged for use.

At block 395, feedback may be received or provided. Feedback may come in various forms. For example, the establishment may receive anonymized information related to substitutions made by various users as well as user preferences of various users. This information may be used by the establishment in various ways, such as to make adjustments to restocking orders. The user may submit a review through the customization system 100, and the customization system 100 may add that review to the food database 180 or may transmit the review to the establishment. In some embodiments of the invention, the customization system 100 enables the user or the establishment to indicate when food was received or when the entire meal was completed, thus enabling the customization to update estimated preparation times in the food database 180. If the customization system 100 has access to a food-tracking application related to the user, the customization system 100 may automatically update that food-tracking application with the user's order. As such, if the user is tracking calories, nutrients, fat, or other food characteristics, the associated tracking data may be automatically kept up to date.

At 398, the customization system 100 may update its data responsive to the order. For example, if feedback is received from one or more users regarding the menu, the menu data 160 may be updated accordingly. For example, the order history in the user profile may be updated by adding the order, scores of ingredients may be updated based on the order, or scores of menu items may be updated based on the order. In some embodiments of the invention, scores of ingredients and menu items may be learned by the customization system 100, using a learning model, and thus feedback regarding the user's ultimate order and satisfaction with that order may be used to further train the learning model. For another example, a change in inventory may be detected based on the order, and the stock data 170 for the establishment may be automatically modified based on that change in inventory. In some embodiments of the invention, the change in inventory may be detected based on the order itself and knowledge of which inventory is needed to fulfill the order, based on manual entry at the console 130 indicating inventory used to prepare the order, based on automated tracking of inventory, or a combination of these or other methods.

Figure 4:
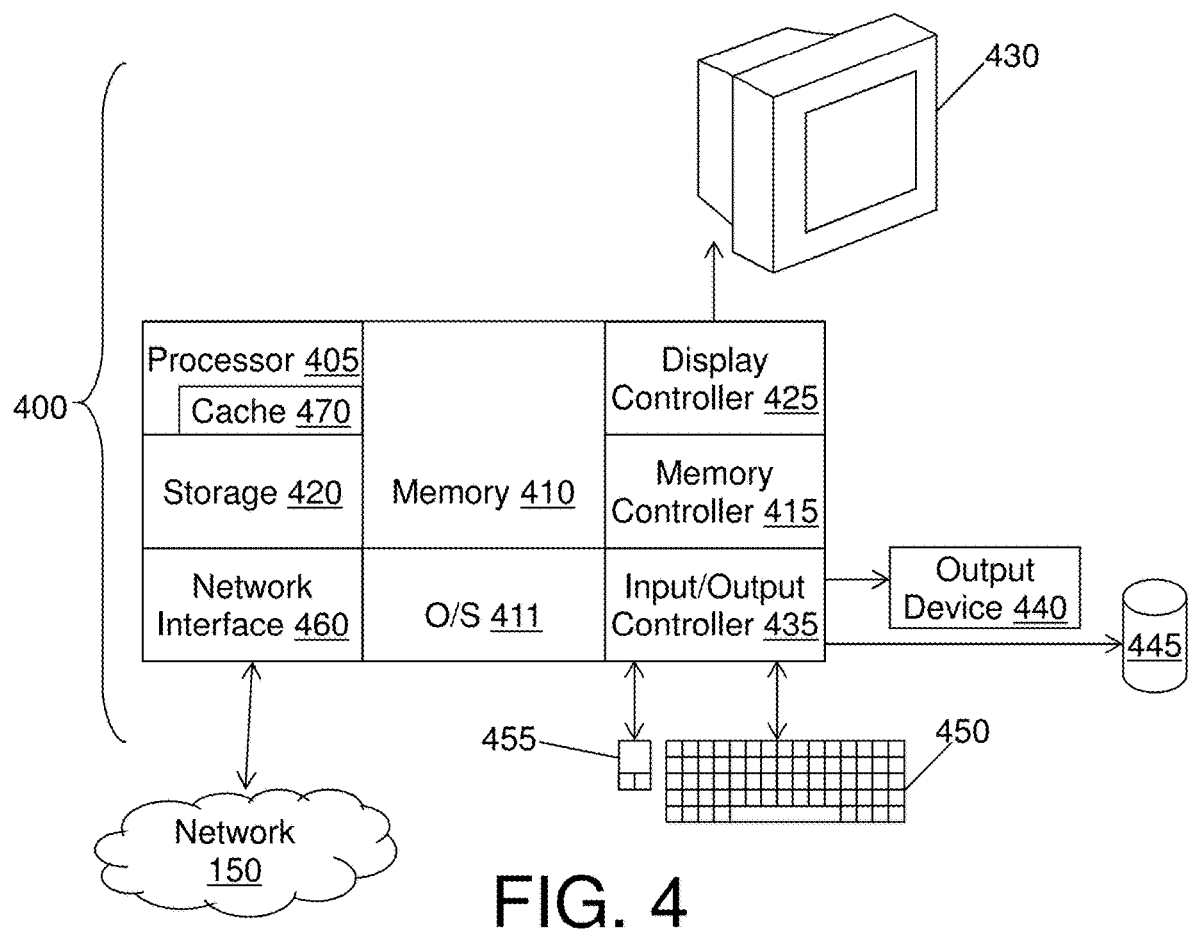
FIG. 4 is a block diagram of a computer system for implementing some or all aspects of the customization system, according to some embodiments of this invention.

FIG. 4 is a block diagram of a computer system 400 for implementing some or all aspects of the system, according to some embodiments of this invention. The customization systems 100 and methods described herein may be implemented in hardware, software (e.g., firmware), or a combination thereof. In some embodiments, the methods described may be implemented, at least in part, in hardware and may be part of the microprocessor of a special- or general-purpose computer system 400, such as a personal computer, workstation, minicomputer, or mainframe computer. For example, and not by way of limitation, each of the console 130, the establishment server 210, the centralized server 140, and the user device 120 may be a special- or general-purpose computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the customization systems 100 and methods of this disclosure.

The computer system 400 may further include a display controller 425 coupled to a display 430. In some embodiments, the computer system 400 may further include a network interface 460 for coupling to a network 150. The network 150 may be an IP-based network for communication between the computer system 400 and an external server, client and the like via a broadband connection. The network 150 transmits and receives data between the computer system 400 and external systems. In some embodiments, the network 150 may be a managed IP network administered by a service provider. The network 150 may be implemented in a wireless fashion, e.g., using wireless protocols and technologies, such as WiFi, WiMax, etc. The network 150 may also be a packet-switched network such as a local area network, wide area network, metropolitan area network, the Internet, or other similar type of network environment. The network 150 may be a fixed wireless network, a wireless local area network (LAN), a wireless wide area network (WAN) a personal area network (PAN), a virtual private network (VPN), intranet or other suitable network system and may include equipment for receiving and transmitting signals.

Customization systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
providing a processor and memory configured to implement a learning model;
identifying a first menu item on a standard menu of an establishment, wherein the standard menu comprises a plurality of menu items;
determining a first plurality of ingredients of the first menu item;
categorizing a first subset of the first plurality of ingredients of the first menu item into a substitutable category, wherein determining that a first subset of the first plurality of ingredients of the first menu items as the substitutable category is based on crowd-sourcing of the standard menu of the establishment;
categorizing a second subset of the first plurality of ingredients of the first menu item into a non-substitutable category, and storing a description of each of the first plurality of ingredients in at least one of menu data and a food database, the description indicating whether each of the first plurality of ingredients is in the substitutable or non-substitutable category;
comparing each ingredient of the first menu item that is in the substitutable category to user preferences, the user preferences including at least one preference input by a user;
comparing each ingredient of the first menu item that is in the non-substitutable category to the user preferences, and excluding the first menu item in response to determining that an ingredient in the non-substitutable category conflicts with the user preferences;

excluding a substitutable ingredient of the substitutable category, wherein the substitutable ingredient is in the first menu item, based at least in part on the comparing each ingredient of the first menu item that is in the substitutable category to the user preferences;

automatically identifying an available substitute for the substitutable ingredient of the substitutable category, responsive to excluding the substitutable ingredient, and based on a user ranking assigned to the available substitute, the user ranking based on the at least one preference input by the user;

determining a respective score for each of the plurality of menu items, including the first menu item;

ranking the plurality of menu items based on the determined scores;

generating a personalized menu of menu items selected from the ranked plurality of menu items, wherein the personalized menu comprises the first menu item modified with the available substitute, based at least in part on identifying the available substitute for the substitutable ingredient; and transmitting an order to the establishment based on a selection of one or more menu items by the user;

operating an automated kitchen to prepare the one or more menu items at the establishment; and retraining the learning model based at least in part on feedback regarding the order and a satisfaction with the order, wherein operating the automated kitchen to prepare the one or more menu items at the establishment comprises: automatically picking ingredients from a storage location for the one or more menu items, arranging the ingredients for use in preparation of the one or more menu items, physically tracking an inventory of ingredients, and adjusting, based on the order, a temperature of a cooking appliance in the automated kitchen to prepare the one or more menu items.

2. The computer-implemented method of claim 1, further comprising:

identifying a second menu item on the standard menu of the establishment;

determining a second plurality of ingredients of the second menu item;

categorizing a first subset of the second plurality of ingredients of the second menu item into the substitutable category;

categorizing a second subset of the second plurality of ingredients of the second menu item into the non-substitutable category;

comparing each ingredient of the second menu item that is in the non- substitutable category to the user preferences;

excluding a non-substitutable ingredient of the non-substitutable category, wherein the non-substitutable ingredient is in the second menu item, based at least in part on the comparing each ingredient of the second menu item that is in the non-substitutable category to the user preferences;

wherein the personalized menu excludes the second menu item, based at least in part on the excluding the non-substitutable ingredient of the second menu item.

3. The computer-implemented method of claim 2, further comprising:

identifying a third menu item on the standard menu of the establishment;

determining a third plurality of ingredients of the third menu item;

categorizing a first subset of the third plurality of ingredients of the third menu item into the substitutable category;

categorizing a second subset of the third plurality of ingredients of the third menu item into the non-substitutable category;

comparing each ingredient of the third menu item that is in the substitutable category to the user preferences;

excluding an other substitutable ingredient of the substitutable category, wherein the other substitutable ingredient is in the third menu item, based at least in part on the comparing each ingredient of the third menu item that is in the substitutable category to the user preferences; and failing to identify an available substitute for the other substitutable ingredient of the substitutable category;

wherein the personalized menu excludes the third menu item, based at least in part on failing to identify an available substitute for the other substitutable ingredient.

4. The computer-implemented method of claim 1, further comprising:

identifying a second menu item on the standard menu of the establishment;

estimating preparation time of the second menu item;

comparing the estimated preparation time of the second menu item to a time budget applicable to a current meal;

wherein the personalized menu excludes the second menu item, based at least in part on the estimated preparation time conflicting with the time budget for the current meal.

5. A system comprising:

a memory having computer-readable instructions; and one or more processors for executing the computer-readable instructions, the computer-readable instructions comprising:

providing a learning model;

identifying a first menu item on a standard menu of an establishment, wherein the standard menu comprises a plurality of menu items;

determining a first plurality of ingredients of the first menu item;

categorizing a first subset of the first plurality of ingredients of the first menu item into a substitutable category, wherein determining that a first subset of the first plurality of ingredients of the first menu items as the substitutable category is based on crowd-sourcing of the standard menu of the establishment;

categorizing a second subset of the first plurality of ingredients of the first menu item into a non-substitutable category, and storing a description of each of the first plurality of ingredients in at least one of menu data and a food database, the description indicating whether each of the first plurality of ingredients is in the substitutable or non-substitutable category;

comparing each ingredient of the first menu item that is in the substitutable category to user preferences, the user preferences including at least one preference input by a user;

comparing each ingredient of the first menu item that is in the non-substitutable category to the user preferences, and excluding the first menu item in response to determining that an ingredient in the non-substitutable category conflicts with the user preferences;
excluding a substitutable ingredient of the substitutable category, wherein the substitutable ingredient is in the first menu item, based at least in part on the comparing each ingredient of the first menu item that is in the substitutable category to the user preferences;
automatically identifying an available substitute for the substitutable ingredient of the substitutable category, responsive to excluding the substitutable ingredient, and based on a user ranking assigned to the available substitute, the user ranking based on the at least one preference input by the user;
determining a respective score for each of the plurality of menu items, including the first menu item;
ranking the plurality of menu items based on the determined scores; and
generating a personalized menu of menu items selected from the ranked plurality of menu items, wherein the personalized menu comprises the first menu item modified with the available substitute, based at least in part on identifying the available substitute for the substitutable ingredient; and
transmitting an order to the establishment based on a selection of one or more menu items by the user;
operating an automated kitchen to prepare the one or more menu items at the establishment; and
retraining the learning model based at least in part on feedback regarding the order and a satisfaction with the order,
wherein operating the automated kitchen to prepare the one or more menu items at the establishment comprises: automatically picking ingredients from a storage location for the one or more menu items, arranging the ingredients for use in preparation of the one or more menu items, physically tracking an inventory of ingredients, and adjusting, based on the order, a temperature of a cooking appliance in the automated kitchen to prepare the one or more menu items.

6. The system of claim 5, the computer-readable instructions further comprising:
identifying a second menu item on the standard menu of the establishment;
determining a second plurality of ingredients of the second menu item;
categorizing a first subset of the second plurality of ingredients of the second menu item into the substitutable category;
categorizing a second subset of the second plurality of ingredients of the second menu item into the non-substitutable category;
comparing each ingredient of the second menu item that is in the non-substitutable category to the user preferences;
excluding a non-substitutable ingredient of the non-substitutable category, wherein the non-substitutable ingredient is in the second menu item, based at least in part on the comparing each ingredient of the second menu item that is in the non-substitutable category to the user preferences;
wherein the personalized menu excludes the second menu item, based at least in part on the excluding the non-substitutable ingredient of the second menu item.

7. The system of claim 6, the computer-readable instructions further comprising:
identifying a third menu item on the standard menu of the establishment;
determining a third plurality of ingredients of the third menu item;
categorizing a first subset of the third plurality of ingredients of the third menu item into the substitutable category;
categorizing a second subset of the third plurality of ingredients of the third menu item into the non-substitutable category;
comparing each ingredient of the third menu item that is in the substitutable category to the user preferences;
excluding an other substitutable ingredient of the substitutable category, wherein the other substitutable ingredient is in the third menu item, based at least in part on the comparing each ingredient of the third menu item that is in the substitutable category to the user preferences; and
failing to identify an available substitute for the other substitutable ingredient of the substitutable category;
wherein the personalized menu excludes the third menu item, based at least in part on failing to identify an available substitute for the other substitutable ingredient.

8. The system of claim 5, the computer-readable instructions further comprising:
identifying a second menu item on the standard menu of the establishment;
estimating preparation time of the second menu item;
comparing the estimated preparation time of the second menu item to a time budget applicable to a current meal;
wherein the personalized menu excludes the second menu item, based at least in part on the estimated preparation time conflicting with the time budget for the current meal.

9. A computer-program product for generating a personalized menu, the computer-program product comprising a computer-readable storage medium having program instructions embodied therewith, the program instructions executable by a processor to cause the processor to perform a method comprising:
providing a learning model;
identifying a first menu item on a standard menu of an establishment, wherein the standard menu comprises a plurality of menu items;
determining a first plurality of ingredients of the first menu item;
categorizing a first subset of the first plurality of ingredients of the first menu item into a substitutable category, wherein determining that a first subset of the first plurality of ingredients of the first menu items as the substitutable category is based on crowd-sourcing of the standard menu of the establishment;
categorizing a second subset of the first plurality of ingredients of the first menu item into a non-substitutable category, and storing a description of each of the first plurality of ingredients in at least one of menu data and a food database, the description indicating whether each of the first plurality of ingredients is in the substitutable or non-substitutable category;
comparing each ingredient of the first menu item that is in the substitutable category to user preferences, the user preferences including at least one preference input by a user;
comparing each ingredient of the first menu item that is in the non- substitutable category to the user preferences, and excluding the first menu item in response to determining that an ingredient in the non-substitutable category conflicts with the user preferences;

excluding a substitutable ingredient of the substitutable category, wherein the substitutable ingredient is in the first menu item, based at least in part on the comparing each ingredient of the first menu item that is in the substitutable category to the user preferences;

automatically identifying an available substitute for the substitutable ingredient of the substitutable category, responsive to excluding the substitutable ingredient, and based on a user ranking assigned to the available substitute, the user ranking based on the at least one preference input by the user;

determining a respective score for each of the plurality of menu items, including the first menu item;

ranking the plurality of menu items based on the determined scores;

generating a personalized menu of menu items selected from the ranked plurality of menu items, wherein the personalized menu comprises the first menu item modified with the available substitute, based at least in part on identifying the available substitute for the substitutable ingredient; and transmitting an order to the establishment based on a selection of one or more menu items by the user;

operating an automated kitchen to prepare the one or more menu items at the establishment; and retraining the learning model based at least in part on feedback regarding the order and a satisfaction with the order, wherein operating the automated kitchen to prepare the one or more menu items at the establishment comprises: automatically picking ingredients from a storage location for the one or more menu items, arranging the ingredients for use in preparation of the one or more menu items, physically tracking an inventory of ingredients, and adjusting, based on the order, a temperature of a cooking appliance in the automated kitchen to prepare the one or more menu items.

10. The computer-program product of claim 9, the method further comprising:
identifying a second menu item on the standard menu of the establishment;
determining a second plurality of ingredients of the second menu item;
categorizing a first subset of the second plurality of ingredients of the second menu item into the substitutable category;
categorizing a second subset of the second plurality of ingredients of the second menu item into the non-substitutable category;
comparing each ingredient of the second menu item that is in the non-substitutable category to the user preferences;
excluding a non-substitutable ingredient of the non-substitutable category, wherein the non-substitutable ingredient is in the second menu item, based at least in part on the comparing each ingredient of the second menu item that is in the non-substitutable category to the user preferences;
wherein the personalized menu excludes the second menu item, based at least in part on the excluding the non-substitutable ingredient of the second menu item.

11. The computer-program product of claim 10, the method further comprising:

identifying a third menu item on the standard menu of the establishment;
determining a third plurality of ingredients of the third menu item;
categorizing a first subset of the third plurality of ingredients of the third menu item into the substitutable category;
categorizing a second subset of the third plurality of ingredients of the third menu item into the non-substitutable category;
comparing each ingredient of the third menu item that is in the substitutable category to the user preferences;
excluding an other substitutable ingredient of the substitutable category, wherein the other substitutable ingredient is in the third menu item, based at least in part on the comparing each ingredient of the third menu item that is in the substitutable category to the user preferences; and
failing to identify an available substitute for the other substitutable ingredient of the substitutable category;
wherein the personalized menu excludes the third menu item, based at least in part on failing to identify an available substitute for the other substitutable ingredient.

12. The computer-implemented method of claim 1, wherein determining a respective score for each of the plurality of menu items comprises:
determining a plurality of variations for the first menu item based on possible ingredient substitutions;
determining a respective score for each of the plurality of variations; and
comparing the respective score of each of the plurality of variations to a threshold score, wherein a subset of the plurality of variations that each have a respective score that exceeds the threshold score is included in the personalized menu.

13. The computer-implemented method of claim 1, wherein automatically identifying an available substitute for the substitutable ingredient of the substitutable category comprises:
identifying a plurality of available substitutes for the substitutable ingredient;
ranking the plurality of available substitutes; and
selecting the available substitute based on the ranked plurality of available substitutes.

14. The computer-implemented method of claim 1, wherein the respective scores are determined based on the learning model, and further comprising:
receiving, from the user, the order of the menu item from the personalized menu;
receiving the feedback regarding the ordered menu item from the user; and
updating a score corresponding to the ordered menu item by the learning model.

15. The system of claim 5, wherein determining a respective score for each of the plurality of menu items comprises:
determining a plurality of variations for the first menu item based on possible ingredient substitutions;
determining a respective score for each of the plurality of variations; and
comparing the respective score of each of the plurality of variations to a threshold score, wherein a subset of the plurality of variations that each have a respective score that exceeds the threshold score is included in the personalized menu.

16. The system of claim 5, wherein automatically identifying an available substitute for the substitutable ingredient of the substitutable category comprises:
 identifying a plurality of available substitutes for the substitutable ingredient;
 ranking the plurality of available substitutes; and
 selecting the available substitute based on the ranked plurality of available substitutes.

17. The system of claim 5, wherein the respective scores are determined based on the learning model, and the computer-readable instructions further comprising:
 receiving, from the user, the order of the menu item from the personalized menu;
 receiving the feedback regarding the ordered menu item from the user; and
 updating a score corresponding to the ordered menu item by the learning model.

18. The computer-program product of claim 9, wherein determining a respective score for each of the plurality of menu items comprises:
 determining a plurality of variations for the first menu item based on possible ingredient substitutions;
 determining a respective score for each of the plurality of variations; and
 comparing the respective score of each of the plurality of variations to a threshold score, wherein a subset of the plurality of variations that each have a respective score that exceeds the threshold score is included in the personalized menu.

19. The computer-program product of claim 9, wherein automatically identifying an available substitute for the substitutable ingredient of the substitutable category comprises:
 identifying a plurality of available substitutes for the substitutable ingredient;
 ranking the plurality of available substitutes; and
 selecting the available substitute based on the ranked plurality of available substitutes.

20. The computer-program product of claim 9, wherein the respective scores are determined based on the learning model, and the method further comprising:
 receiving, from the user, the order of the menu item from the personalized menu;
 receiving the feedback regarding the ordered menu item from the user; and
 updating a score corresponding to the ordered menu item by the learning model.

* * * * *